J. LIEFBROER & J. TENDOLLEN.
SAFETY VALVE FOR TIRE PUMPS AND THE LIKE.
APPLICATION FILED MAY 22, 1916.

1,203,754.

Patented Nov. 7, 1916

UNITED STATES PATENT OFFICE.

JOHN LIEFBROER AND JOHN TENDOLLEN, OF OOSTBURG, WISCONSIN.

SAFETY-VALVE FOR TIRE-PUMPS AND THE LIKE.

1,203,754.

Specification of Letters Patent.

Patented Nov. 7, 1916.

Application filed May 22, 1916. Serial No. 99,167.

*To all whom it may concern:*

Be it known that we, JOHN LIEFBROER and JOHN TENDOLLEN, both citizens of the United States, and residents of Oostburg, in the county of Sheboygan and State of Wisconsin, have invented certain new and useful Improvements in Safety-Valves for Tire-Pumps and the like; and we do hereby declare that the following is a full, clear, and exact description thereof.

The present invention relates to new and useful improvements in safety valves.

In pumping pneumatic tires, considerable inconvenience is encountered in determining the desired degree of pressure attained and considerable danger of blowing out the tire attends the possibility of procuring an excessively great pressure.

It is the object of the present invention to provide a safety valve device which may be associated with tire pumping and similar operations for the purpose of relieving excessively high pressure and also for the purpose of indicating a desired maximum pressure.

It is further an object to provide a safety valve device of this nature which is adjustable for operation at different desired pressures.

It is still further an object to provide such a device which is of exceedingly simple nature and which is so designed that it may be spliced into a section of flexible tubing, and remain operative in different relative positions.

With the above and other objects and advantages in view, the invention resides more particularly in the novel combination arrangement and formation of parts more particularly hereinafter described and more particularly pointed out in the appended claim.

Figure 1:
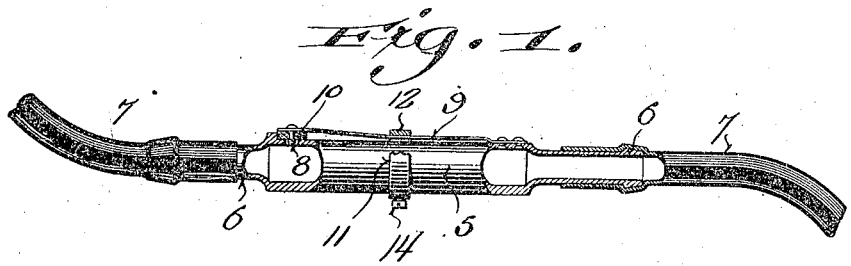
Figure 2:
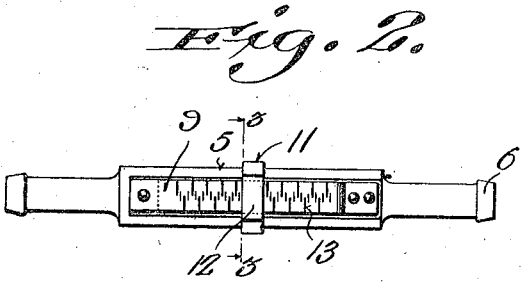
Figure 3:
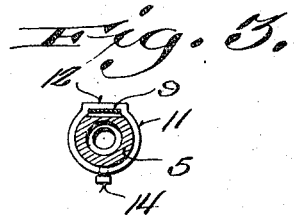

In the drawings, Figure 1 is a side elevational view of the improved safety valve connected with sections of flexible tubing and with portions broken away to more clearly disclose the structure. Fig. 2 is a top plan view of the device. Fig. 3 is a transverse sectional view taken through the device on the line 3—3 of Fig. 2 and showing the adjusting band for the spring strip.

Referring now more particularly to the accompanying drawings, the improved safety valve comprises a tubular body 5 having its ends reduced and provided with circumscribing beads 6 whereby the body may be interposed between sections of rubber or other flexible tubing 7. One side of the body is flattened and one end of this flattened side is provided with a discharge port 8. Secured to the other end of the flattened side is one end of a spring strip 9 which extends longitudinally along the side and which carries at its other end a valve head block 10 formed of rubber or similar material providing for proper engagement with the edge of the port as a seat, and held to the seat by the resiliency of the spring strip. Thus the degree of resilient pressure exerted by the strip determines the critical pressure at which the valve will open.

For varying the resilient pressure of the strip as desired to meet different conditions, a band 11 is disposed about the body and strip, the strip being disposed in an offset portion 12 of the band. Thus by sliding the band toward or away from the valve head, the resilient pressure exerted by the spring strip will be correspondingly increased or lessened particularly inasmuch as the strip has some tendency to bow outwardly. Thus the critical pressure at which the valve operates may be varied, and to determine desired degrees of resistance the strip is provided with series of graduations 13 by which to set the adjusting band 11. The band is locked in desired position by a set screw 14 passed therethrough and engaging the body.

The present device is particularly adapted for interposition in the usual flexible pipe of a tire pump, and thus upon the desired degree of pressure being attained the valve will open to eliminate the danger of blowing out the tire and to indicate the attainment of a desired degree of compression. In view of the simplicity and compactness of the structure, the liability of accidental damage when used in this connection is considerably lessened.

Although the present device has been described as particularly adapted for association with tire pumping operations, it will be readily understood that various applications may be found for the invention, and that various modifications to meet differing conditions may be employed within the scope of the appended claim.

We claim:

A safety valve of the class described comprising a tubular body member provided with an opening in one end, a spring strip secured to the other end of said body member and extended adjacent said opening, a valve head secured to the leaf spring and normally urged to close the opening and a band surrounding the tube and spring and movable longitudinally thereof, said band having a portion thereof outwardly offset to receive said spring strip.

In testimony that we claim the foregoing we have hereunto set our hands at Oostburg, in the county of Sheboygan and State of Wisconsin, in the presence of two witnesses.

JOHN LIEFBROER.
JOHN TENDOLLEN.

Witnesses:
  JOHN BRETHOUWER,
  B. BRETHOUWER.